(12) United States Patent
Brekke et al.

(10) Patent No.: US 8,773,277 B2
(45) Date of Patent: *Jul. 8, 2014

(54) ROUTING FACILITY FOR A SUBSEA ELECTRONICS MODULE

(75) Inventors: Endre Brekke, Trondheim (NO); Vegard Horten, Rasta (NO); Vidar Steigen, Nittedal (NO)

(73) Assignee: Siemens Aktiengesellschaft, Munich (DE)

( * ) Notice: Subject to any disclaimer, the term of this patent is extended or adjusted under 35 U.S.C. 154(b) by 1108 days.

This patent is subject to a terminal disclaimer.

(21) Appl. No.: 12/441,985

(22) PCT Filed: Sep. 25, 2006

(86) PCT No.: PCT/EP2006/009307
§ 371 (c)(1),
(2), (4) Date: Mar. 19, 2009

(87) PCT Pub. No.: WO2008/037267
PCT Pub. Date: Apr. 3, 2008

(65) Prior Publication Data
US 2010/0020813 A1    Jan. 28, 2010

(51) Int. Cl.
*H04B 13/02* (2006.01)
*H05K 1/11* (2006.01)

(52) U.S. Cl.
USPC ..... 340/850; 340/852; 340/853.7; 340/854.9; 340/855.1; 340/855.4; 361/792

(58) Field of Classification Search
USPC ............ 340/850, 852, 853.7, 854.9, 855.1, 340/855.4; 361/792
See application file for complete search history.

(56) References Cited

U.S. PATENT DOCUMENTS

| | | | |
|---|---|---|---|
| 5,892,924 A | 4/1999 | Lyon et al. | 395/200.75 |
| 6,229,576 B1 | 5/2001 | Tarr et al. | 348/575 |
| 2003/0109281 A1 | 6/2003 | Knoblach et al. | 455/556 |
| 2003/0208638 A1 | 11/2003 | Abrams, Jr. et al. | 709/328 |
| 2004/0234019 A1 | 11/2004 | Kim et al. | 375/372 |
| 2005/0023656 A1* | 2/2005 | Leedy | 257/678 |
| 2005/0143022 A1 | 6/2005 | Elayda et al. | 455/90.3 |
| 2005/0273821 A1 | 12/2005 | Hundley | 725/62 |
| 2006/0133389 A1 | 6/2006 | Wybenga et al. | 370/401 |
| 2007/0214949 A1 | 9/2007 | Barton | 86/50 |

FOREIGN PATENT DOCUMENTS

| | | | | |
|---|---|---|---|---|
| EP | 0975097 A2 | 1/2000 | | H04B 3/54 |
| EP | 0975097 A3 | 11/2003 | | H04B 3/54 |

OTHER PUBLICATIONS

Ameli F: "The NEMO floor control module" Real Time Conference, 2005, 14th IEEE-NPSS Stockholm, Sweden, Jun. 4-10, 2005, pp. 54-58, XP010858976; Others.

(Continued)

*Primary Examiner* — Daniel Wu
*Assistant Examiner* — John Bamert
(74) *Attorney, Agent, or Firm* — King & Spalding L.L.P.

(57) ABSTRACT

A routing facility (1) for a subsea electronics module (7) has on a single circuit board (2) a facility (5) for routing data packets between segments of a differential serial bus, and at least one input/output interface (14, 15, 16) for digital and/or analog process values, wherein the process values are accessible via the differential serial bus.

7 Claims, 3 Drawing Sheets

(56) References Cited

OTHER PUBLICATIONS

Nicolau et al: "An FPGA-based readout electronics for neutrino telescopes", Nuclear Instruments & Methods in Physics Research, Section -A: Accelerators, Spectrometers, Detectors and Associated Equipment, Elsevier, Amsterdam, NL, vol. 567, No. 2, 15. Nov. 2006, pp. 552-555, XP005712278; Others.

* cited by examiner

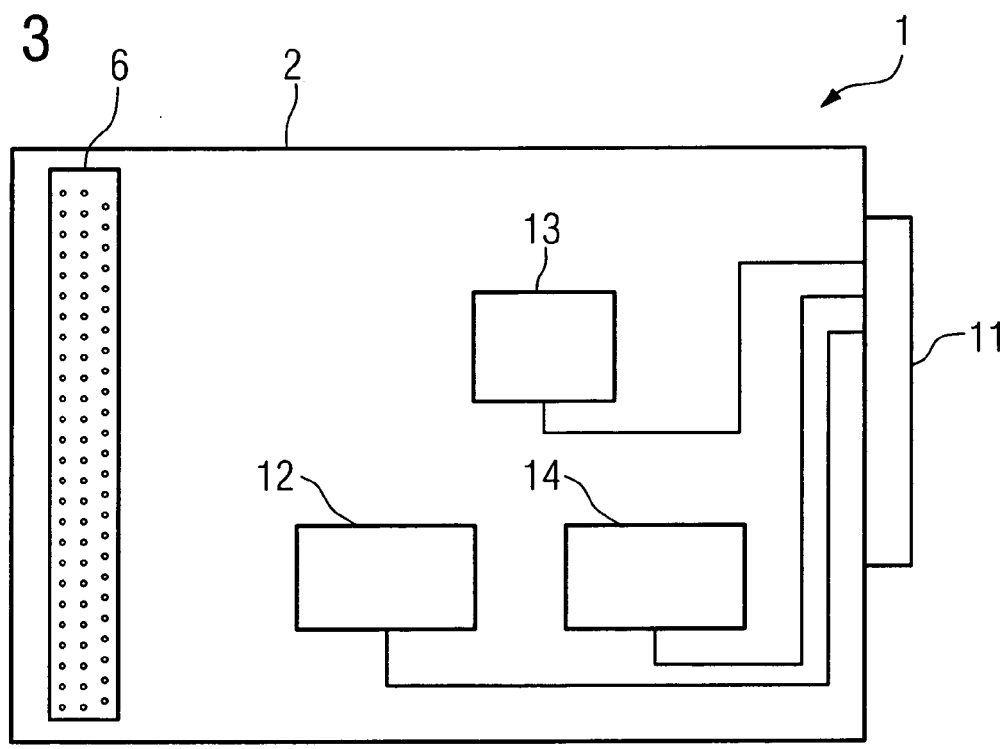

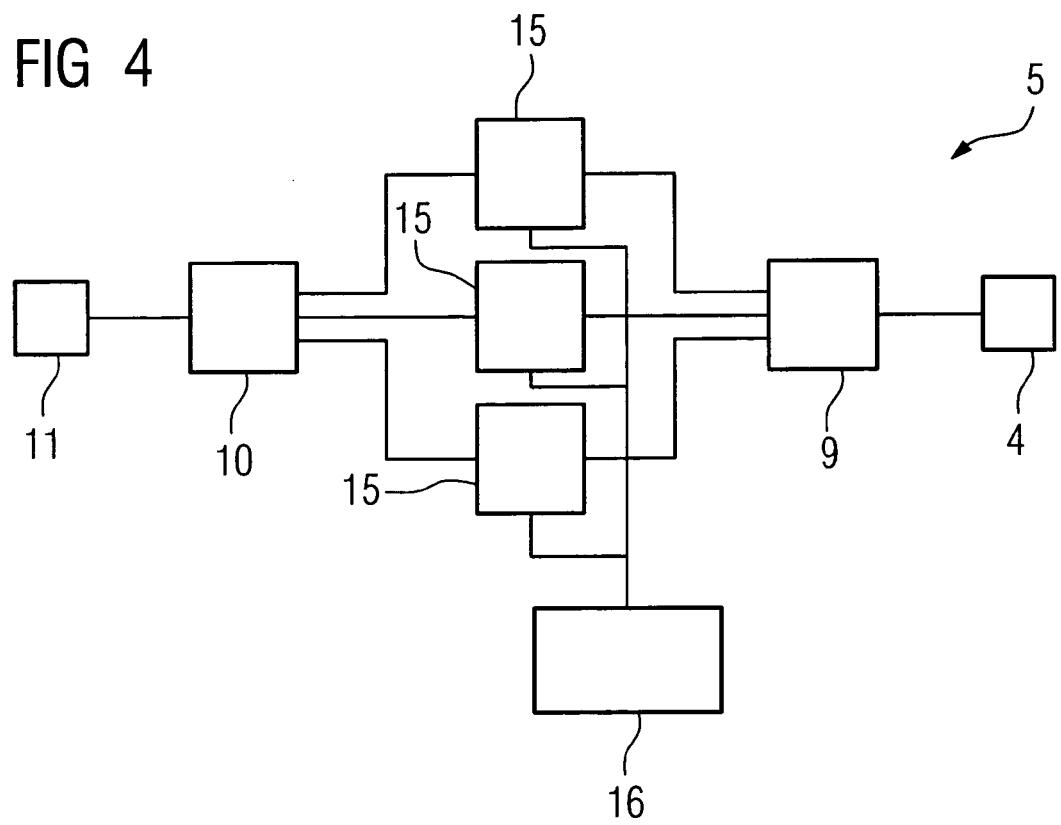

ROUTING FACILITY FOR A SUBSEA ELECTRONICS MODULE

CROSS-REFERENCE TO RELATED APPLICATIONS

This application is a United States national phase filing under 35 U.S.C. §371 of International Application No. PCT/EP2006/009307, filed Sep. 25, 2006. The complete disclosure of the above-identified application is hereby fully incorporated herein by reference.

TECHNICAL FIELD

The invention relates to a routing facility for a subsea electronics module (SEM).

BACKGROUND

Subsea electronics modules are preferably used in subsea control units (SCU), e.g., wellhead control units (WCU), for exploring and exploiting gas and oil fields located at the seabed. Gas and oil fields that are explored or exploited using electronic communication to the wellheads or to other subsea control units are sometimes called "electronic fields" (e-fields).

Typically, several subsea control units and several sensors are located in a vicinity of a respective gas or oil field, and are connected to a topside control site. For this purpose, subsea communication is used. For example, process data are transmitted between the topside control site and the subsea control units. In order not to require individual communication and power lines for each subsea control unit, the subsea control units are arranged on the seabed in a network topology. One network member is equipped with a modem for subsea communication with the topside control site. The process data are routed within the network to reach the respective recipient, e.g. either the topside control site or a certain subsea electronic module. Usually, a differential serial bus is used for the network.

In prior art, different techniques for subsea communication have been described. On the one hand, there are wired electric or optical connections, on the other hand there are wireless connections. The wired connections can be subdivided into a first group providing communication lines for electronic or optical connections separate from electric power lines, and a second group utilising power lines for electronic communications. In the latter case, advantageously no separate communication lines are needed.

Known subsea control units require at least two input/output (I/O) interface cards for acquisition and/or output of digital and analogue process data. In addition, the known subsea control units require one routing card for each network/bus member that is to be directly connected to them. Hence, if several Slave subsea control units are to be connected to one subsea Master control unit comprising a modem, the same number of routing cards has to be installed into the subsea Master control unit. The number of required cards increases if process data is to be acquired or if a process has to be controlled. These multiple cards are space-consuming and power-consuming.

SUMMARY

According to various embodiments, a routing facility for a subsea electronics module can be specified by which space and power can be saved within the subsea electronics module.

According to an embodiment, a routing facility for a subsea electronics module, may comprise on a single circuit board: —means for routing data packets between segments of a differential serial bus, and —at least one input/output interface for digital and/or analogue process values, wherein the process values are accessible via the differential serial bus.

According to a further embodiment, the routing facility may comprise a total of three input/output interfaces, namely a digital input interface, a digital output interface and an analogue input interface. According to a further embodiment, the routing facility may comprise as the means for routing: —a microcontroller, —a field programmable gate array, and —at least two router resources, —each router resource comprising a respective local transceiver for a differential serial bus and a respective remote transceiver for the differential serial bus, —wherein each local transceiver is connected with the corresponding remote transceiver and with the field programmable gate array that is able to route data packets between the router resources. According to a further embodiment, each of the remote transceivers may be galvanically isolated from the corresponding local transceiver, wherein the remote transceivers are floating and the local transceivers are related to a local electrical ground, and wherein each of the remote transceivers comprises active bus termination means and bias means. According to a further embodiment, the microcontroller and the field programmable gate array may be connectable to a main control unit of the subsea electronics module via a control bus. According to a further embodiment, the control bus may be connectable to the main control unit via a plug-and-socket connection.

According to another embodiment, a subsea electronics module for a subsea control unit may comprise such a routing facility as described above.

BRIEF DESCRIPTION OF THE DRAWINGS

In the following, the invention is described in further detail with several drawings.

FIG. 3 shows a block diagram of the back side of the routing facility circuit card.

FIG. 4 shows a block diagram of one router resource.

In all drawings, corresponding parts are denoted by identical reference signs.

DETAILED DESCRIPTION

Figure 1:
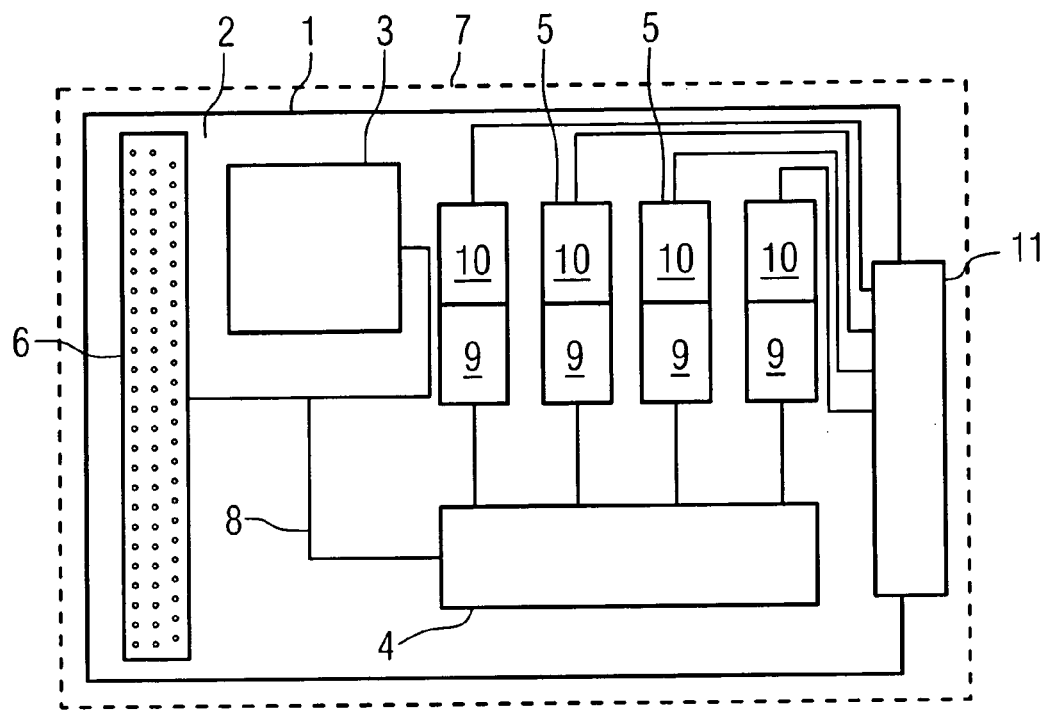
FIG. 1 shows a block diagram of the first side of a routing facility circuit board.

According to various embodiments, a routing facility for a subsea electronics module comprises, on a single circuit board, means for routing data packets between segments of a differential serial bus, and at least one input/output interface for digital and/or analogue process values, wherein said process values are accessible via said differential serial bus. If such a routing facility is used in a subsea electronics module, power consumption as well as required space are significantly reduced in comparison to a prior art router card in combination with multiple prior art input/output interface cards, as additional input/output cards can be omitted. In the diction of the invention, the term "input/output interface" comprises both one-directional and bi-directional interfaces, i.e., pure input interfaces, pure output interfaces, and combined input/output interfaces.

A prototype of a routing facility embodiment has been built, comprising a preferred total of three one input/output interfaces, namely a digital input interface, a digital output interface and an analogue input interface. By this embodiment, two conventional input/output interface cards can be omitted although universal connectability for both types of data, digital and analogue, is provided. Therefore, the subsea electronic module can be constructed very compactly.

In a highly preferred embodiment, the routing facility comprises a microcontroller, a field programmable gate array (FPGA) and at least two router resources as said means for routing, wherein each router resource comprises a respective local transceiver for a differential serial bus and a respective remote transceiver for the differential serial bus, and wherein each local transceiver is connected with the corresponding remote transceiver and with said field programmable gate array that is able to route data packets between said router resources.

In particular, said transceivers can be half-duplex transceivers for realizing a PROFIBUS DP (process field bus: decentralized peripherals) differential serial bus. Alternatively, the differential serial bus may be a CAN (controller area network) bus.

A high fault tolerance of subsea networks can be reached with an embodiment where each of said remote transceivers is galvanically isolated from the corresponding local transceiver, wherein said remote transceivers are floating and said local transceivers are related to a local electrical ground, and wherein each of said remote transceivers comprises active bus termination means and bias means.

Faults and defects due to voltage peaks, potential differences or short circuits in a seawater cable can be avoided by this embodiment.

In another embodiment, each of said remote transceivers comprises active bus termination means and bias means. This increases fault tolerance, too, because the remaining bus/network can be kept working even if one seawater cable is interrupted, for example, if it is accidentally cut.

Preferably, said microcontroller and said field programmable gate array are connectable to a main control unit of the subsea electronics module via a control bus. This enables fast data exchange between the main control unit and the routing facility, in particular for communicating data packets to a modem driven by the main control unit.

Preferably, said router resources provide a variable transmission bit rate. The communication speed on the differential bus can thus be adjusted to a communication speed of a link to the topside control side, for example. Such a link may be, for instance, a power line. In particular, the bit rate on the differential bus can be set to fully exploit the actual maximum communication speed of the topside link. In particular, in embodiments where the microcontroller and the field programmable gate array are connectable to a main control unit of the subsea electronics module via the control bus the bit rate to any connected remote slave device can be adjusted via the routing facility. Each routing channel is transparent with respect to the bit rate of the data passing trough it.

In another embodiment, said control bus is connectable to the main control unit via a plug-and-socket connection. Therefore, the circuit board can be simply exchanged in case of a defect or a hardware update. In particular, it can be designed as a stackable card such as proposed by the PC104 standard, thus further reducing space consumption.

Of course, the invention also relates to a subsea electronics module for a subsea control unit, the subsea electronics module comprising a routing facility according to various embodiments.

The routing facility 1 shown in a front view in FIG. 1 is a single printed circuit board 2 comprising on its first side a microcontroller 3, a field programmable gate array 4 and four router resources 5 alongside a double D-Sub plug-and-socket connector 6. The plug-and-socket connector 6 is arranged through the circuit board 2, having an exemplary 104-pin plug on one side of the circuit board 2 and a corresponding socket on the other side. For example, it is a stackable bus connector according to the PC104 standard. This allows for stacking together the routing facility 1 card with other cards having the same connector type. Such a card stack requires minimal space in a subsea electronic module 7 of a subsea control unit.

The circuit board 2 has a format according to the PC104 standard, for example. Via the plug-and-socket connector 6, it can be connected to the control bus 8 of a subsea electronic module (not shown), in particular to a main control unit (not shown) of such a module. The control bus 8 is an 8-bit industry standard architecture (ISA) bus in the depicted example. Alternatively, it may be a wider ISA bus, a PCI bus or an IEEE 1394 bus, for example. However, the routing facility 1 can also be used separately without a stack. For this purpose, it can alternatively be connected to a subsea electronic module 7 via a bus according to the $I^2C$ standard. The routing facility 1, in particular the microcontroller 3, can also be connected to a subsea electronic module via a RS-232 serial interface (not shown) for maintenance access. The routing facility 1 card, i.e., the circuit board 2, may also be used in stand alone operation without a PC104 stack. However, if a PC104 connection is present, power supply for the routing facility 1 is available from it. It is possible to use other power sources as well, in particular in stand alone operation.

Each router resource 5 comprises one half-duplex local transceiver 9 for a differential serial bus and one half-duplex remote transceiver 10 for the differential serial bus. The differential serial bus is a RS-485 PROFIBUS DP in the depicted example. Alternatively, it can be a CAN bus, for example. It is also possible to use full-duplex transceivers 9, 10. The subsea electronic unit 7 can have a Slave of the differential serial bus connected to a topside Master, plus it can provide one or more individual differential serial bus Masters that have separate Slaves attached to their router resources 5.

The remote transceivers 10 are galvanically isolated from the remaining parts of the routing facility 1, in particular from the local transceivers 9. They are provided with active bus termination means (not shown in this figure) and bias means (not shown in this figure). Each remote transceiver 10 is connected to different pins of a single 44-pin plug 11 providing all external connections. In particular, external bus members for the differential serial bus can be connected via the different pins of the plug 11. The plug 11 also can be used for a RS-232 connection to a serial port of an external PC, in particular in stand alone operation of the routing facility 1.

The local transceivers 9 are connected to separate bus ports of the field programmable gate array 4. Each remote transceiver 9 is supplied by a respective direct current/direct current converter (not shown in this figure) that is individually disengageable by the field programmable gate array 4. Usually, a direct current/direct current converter is enabled only if a remote bus member is connected to the corresponding router resource 5 to save power.

Possible bus members that can be connected to the pins of the plug 11 are, for example, other subsea control units, i.e., their electronic modules 7, or sensors (not shown in this figure) able to provide their process data over the differential serial bus. Such sensors are preferably deployed outside the subsea control unit, for example in well trees or on pipelines. The sensors can be seawater sensors, pressure sensors or temperature sensors, for example. These sensors monitor the oil/gas/water production process.

The microcontroller 3 and the field programmable gate array 4 are directly connected to the control bus 8, by which they are accessible, for example, from the main control unit of the subsea electronic module 7 into which the routing facility 1 card is plugged by the plug-and-socket connector 6. The microcontroller 3 serves for setting the PC104 address in a register in the field programmable gate array 4, and for enabling PC104 access to the field programmable gate array 4. It additionally serves for reading and writing all field programmable gate array 4 registers and storing the predefined status conditions. This enables to enter a predefined status upon power-on.

The field programmable gate array 4 has a hardware implementation of all logic for decoding of the PC104 interface. It contains the physical registers for the commands and responses. The router logic is completely implemented in the field programmable gate array 4. There are four instances of this logic in the field programmable gate array 4, each corresponding to one of the router resources 5, and they are controlled by bits in the command registers. Four bits in a Router Control Register in the field programmable gate array 4 enable/disable the router resources 5. If one of the bits is zero, the corresponding router resource 5 will not pass on data from any direction. If the field programmable gate array 4 detects a hardware error in the differential serial bus it automatically shuts down the relevant router resource 5.

A data packet arriving at the field programmable gate array 4 either via the control bus 8, i.e. from the main control unit of the subsea electronic module, or from one of the router resources 5, i.e., from an external source, is routed by the field programmable array 4 to the respective bus destination given in the data packet header. For transmission over the control bus 8, the differential serial bus data packets are wrapped into control bus 8 packets. The field programmable gate array is responsible for wrapping/unwrapping respective data packets routed to or from the control bus 8. As the router resources 5 are connected to individual ports of the field programmable gate array 4, the routing facility 1 works as a switch, resulting in minimal bus collisions.

All router resources 5 can work at variable bit rates from 9600 bit/s up to 10 Mbit/s. The field programmable gate array 4 provides a transparent bit rate with a small delay. It listens for traffic in both ends. The side that detects traffic first is connected to the other side. And because each transceiver 9, 10 needs two microseconds to turn off its receiver and to turn on its transmitter, the field programmable gate array 4 delays the data packet bit stream with two microseconds by a shift register (not shown).

The individual router resources 5 can serve different Slave network sections with equal or different communication speeds, i.e., bit rates. In a PROFIBUS DP network the DP Master always defines the communication speed for all DP Slaves that are connected to this DP Master. The main communication channel is with one DP Master located at the topside. This topside DP Master is controlling the DP speed and DP protocol bus parameters which is distributed to all connected subsea DP Slaves upon DP Master start-up sequence.

The maximum differential serial bus bit rate is determined by the various cable characteristics and the length of the various cables in each differential serial bus network. The chosen bit rate is set manually by an expert engineer in a Master bus configuration setup. The consecutive Master restart is activated, and the connected Slaves, including the router channels, will respond according to the DP Master's new communication speed. If it is difficult for an expert engineer to plan the communication speed, the Master can be configured with increased bus bit rate followed by new link resets. In this way it is possible to find the highest possible bit rate for each differential serial bus network. This procedure is used in a planned commissioning activity before a complete system start-up.

In special embodiments providing power line communication via power line modems, a power line modem may give a read-out of the maximally possible bit rate via a diagnosis interface after the modem initialisation is completed. The expert engineer can use this information to set the highest possible differential serial bus bit rate on the Master bus configuration setup.

Figure 2:
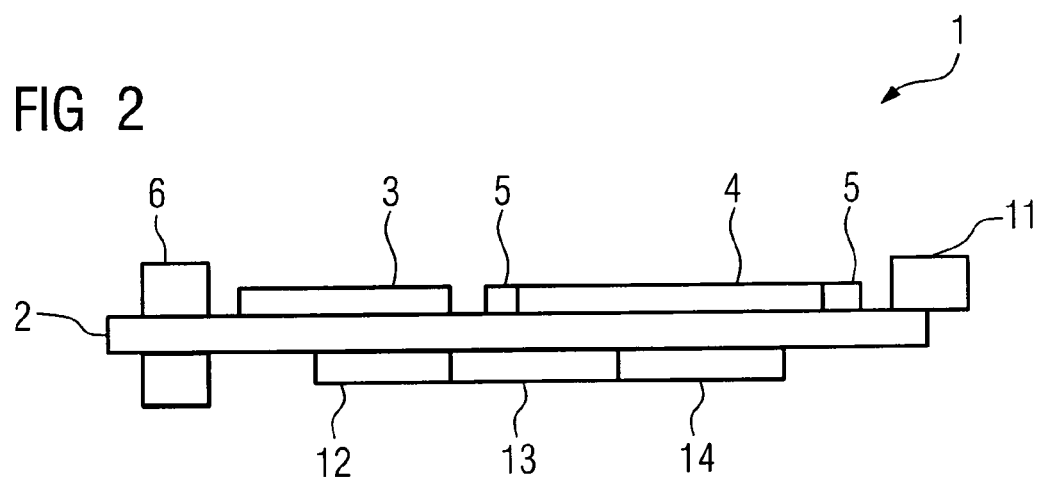
FIG. 2 shows a schematic side view of the routing facility circuit board.

FIG. 2 shows a schematic side view of the circuit board 2 comprising the routing facility 1 on its upper side. On the second side, three dedicated input/output interfaces 12, 13, 14 are arranged, namely a digital input interface 12, a digital output interface 13 and an analogue input interface 14. Each interface 12, 13, 14 has multiple ports 11 for acquiring and outputting process data, respectively.

The input/output interfaces 12, 13, 14 can be seen better in FIG. 3 which shows a schematic view onto the back side of the circuit board 2. Arranging the routing facility 1 and input/output interfaces 12, 13, 14 on both sides of a single circuit board 2 results in further reduction of power consumption and space consumption, as in prior art three separate input/output cards were necessary for this purpose. By the routing facility 1 according to this example, the required number of cards can be reduced from four (two standard input/output interface cards, one router card, one custom-made input/output card) to one. Thus, power consumption as well as space consumption are reduced to approximately one fourth in comparison to prior art. The communication bit rate is variable, allowing for achieving a maximum bus data transmission speed for each individual subsea installation depending on the environmental situation. Besides, due to bus termination, bias and galvanic isolation, the routing facility 1 is insensitive to external disturbances such as broken seawater cables or external short circuits.

The input/output interfaces provide universal connectability for digital and/or analogue process data sources. Digital/analogue signal sources can be connected at ports 11. The main control unit (not shown in this figure) of the subsea electronic module (not shown in this figure) accesses the input/output interfaces 12, 13, 14 via the control bus 8 and the microcontroller 3 to which the interfaces 12, 13, 14 are connected. In contrast to the router resources 5, they are not directly connected to the control bus 8.

The digital input interface 12 can be used, for example, for acquiring the status of relays, in particular switches and power relays, or the status of power sensing circuits. The digital output interface 13 can be used, for example, for setting/clearing the status of such a relay, in particular power-resetting a remote sensor interface. The analogue input interface 14 can be used, for example, for values resulting from insulation monitoring of seawater electric cables or pressure measurement or temperature measurement inside a subsea control unit or a pipeline. For instance, the insulation monitoring of power and differential serial bus seawater cables may result in analogue voltages corresponding to resistance values between 100 kOhm and 18 MOhm. If insulation is damaged, the resistance value will significantly drop. This can be detected by the microcontroller 3 in the digitized voltage values, whereby the respective router resource (not shown in this figure) can be disabled. The analogue input interface 14 comprises an exemplary 16-bit analogue-to-digital converter. All input values are buffered for the microcontroller 3 to read them out and process them further. For example, the microcontroller 3 can either reply the digital/ digitized values to time-based queries of the topside control site, or it may itself monitor the values and only report deviations from predefined tolerable value intervals.

The digital/digitized values can be stored in registers of the field programmable gate array (not shown in this figure) in the form of different ring loops by the microcontroller 3. From there, the values can be read out by other bus members, in particular by the topside control site (not shown in this figure).

FIG. 4 shows one of the router resources 5 in the form of a block diagram. The local transceiver 9 is located on the right side and is connected to the field programmable gate array 4. The remote transceiver 10 is located on the left side. Three optocouplers 15 provide galvanic isolation for the remote transceiver 10. Floating power for the remote transceiver 10 is supplied by a direct current/direct current converter 16. The local transceiver 9 is related to ground of the subsea electronic module 7. The transceivers 9, 10 are designed for a maximum bit rate of 10 Mbit/s. The optocouplers 15 are designed for a maximum bit rate of 25 Mbit/s.

Each router resource 5 has an error detector (not shown) that monitors the incoming voltage levels at both the local side and the remote side. If the voltages of the two lines of one side differ about more than a predefined difference for more than 10 bits at the lowest bit rate of 9600 bit/s, the respective router resource 5 is disabled. One of eight status bits in a Router Status Register in the field programmable gate array is set to indicate which router resource 5 and on which side (local/remote) the problem is located. By writing a '1' into a status bit indicating an error, the error is cleared and the corresponding error detector is re-armed.

A respective control bit in the Router Control Register of the field programmable gate array 4 corresponds to each direct current/direct current converter 16. If a bit is zero, the corresponding direct current/direct current converter 16 is disengaged, otherwise it is enabled. Therefore, power can be saved by only enabling direct current/direct current converter 16 actually having attached another bus member.

The invention claimed is:

1. A routing facility for a subsea electronics module, comprising:
a first region of a single planar circuit board including:
a differential serial bus,
a control bus of the subsea electronics module,
a microcontroller directly connected to the control bus,
a plug providing external connection to the circuit board,
a plurality of router resources configured to route data packets between segments of the differential serial bus,
wherein each router resource coin rises one local transceiver connected to one remote transceiver connected to unique pins of the plug,
wherein each of the remote transceivers is galvanically isolated from its respective local transceiver, and
an integrated circuit routing device connected to the control bus and configured to receive data from a main control unit of the subsea electronic module and from the router resources,
wherein each of the local transceivers is separately connected to the integrated circuit routing device, and
wherein the integrated circuit routing device is configured to route the received data through the differential serial bus, and
a second region of the circuit board including:
three input/output interfaces, including a digital input, a digital output interface, and an analog input interface,
wherein the interfaces are connected to the microcontroller via the differential serial bus, the router resources, and the integrated circuit routing device such that the interfaces are accessible to the main control unit via the microcontroller.

2. The routing facility according to claim 1, wherein the integrated circuit routing device is a field programmable gate array.

3. The routing facility according to claim 2, wherein the remote transceivers are floating and the local transceivers are connected to a local electrical ground, and wherein each of the remote transceivers comprises active bus termination means and bias means.

4. The routing facility according to claim 1, wherein the control bus is operable to be connected to the main control unit via a plug-and-socket connection provided on the circuit board.

5. The routing facility according to claim 4, wherein the plug-and-socket connector is arranged through the circuit board and configured as a stackable bus connector with the plug a first side of the board and the socket on an opposite second side of the board.

6. The routing facility according to claim 1, wherein the first region of the single planar circuit board comprises a first side of the board, and the second region of the single planar circuit board comprises a second side of the board opposite the first side.

7. A subsea electronics module for a subsea control unit, the subsea electronics module comprising:
a routing facility comprising a single planar circuit board including:
a first region including:
a differential serial bus,
a control bus of the subsea electronics module,
a microcontroller directly connected to the control bus,
a plug providing external connection to the circuit board,
a plurality of router resources configured to route data packets between segments of the differential serial bus,
wherein each router resource comprises one local transceiver connected to one remote transceiver connected to unique pins of the plug,
wherein each of the remote transceivers is galvanically isolated from its respective local transceiver, and
an integrated circuit routing device connected to the control bus and configured to receive data from a main control unit of the subsea electronic module and from the router resources,
wherein each of the local transceivers is separately connected to the integrated circuit routing device, and
wherein the integrated circuit routing device is configured to route the received data through the differential serial bus, and
a second region including:
three input/output interfaces, including a digital input interface, a digital output interface, and an analog input interface,
wherein the interfaces are connected to the microcontroller via the differential serial bus, the router resources, and the integrated circuit routing device such that the interfaces are accessible to the main control unit via the microcontroller.

* * * * *